(12) United States Patent
Guenther

(10) Patent No.: US 8,612,769 B2
(45) Date of Patent: Dec. 17, 2013

(54) ELECTRONIC SIGNATURE METHOD AND DEVICE

(75) Inventor: Andreas Guenther, Esslingen a.N. (DE)

(73) Assignee: Stepover GmbH, Stuttgart (DE)

( * ) Notice: Subject to any disclaimer, the term of this patent is extended or adjusted under 35 U.S.C. 154(b) by 285 days.

(21) Appl. No.: 13/040,186

(22) Filed: Mar. 3, 2011

(65) Prior Publication Data

US 2011/0231666 A1 Sep. 22, 2011

(30) Foreign Application Priority Data

Mar. 16, 2010 (EP) .................................... 10002767

(51) Int. Cl.
*H04L 29/06* (2006.01)

(52) U.S. Cl.
USPC ........... 713/186; 713/168; 713/170; 713/171; 713/173; 713/176; 713/185; 709/238; 709/239; 709/240

(58) Field of Classification Search
USPC ........................................................ 713/186
See application file for complete search history.

(56) References Cited

U.S. PATENT DOCUMENTS

| | | | |
|---|---|---|---|
| 5,195,133 A | 3/1993 | Kapp et al. | |
| 5,208,858 A | 5/1993 | Vollert et al. | |
| 5,297,202 A | 3/1994 | Kapp et al. | |
| 5,544,255 A | 8/1996 | Smithies et al. | |
| 5,689,567 A | 11/1997 | Miyauchi | |
| 6,307,955 B1 | 10/2001 | Zank et al. | |
| 6,553,494 B1 * | 4/2003 | Glass | 713/186 |
| 6,792,536 B1 | 9/2004 | Teppler | |
| 7,024,562 B1 | 4/2006 | Flink et al. | |
| 8,285,991 B2 * | 10/2012 | Scheidt | 713/170 |
| 2005/0132196 A1 | 6/2005 | Dietl | |
| 2006/0242423 A1 | 10/2006 | Kussmaul | |
| 2007/0050618 A1 | 3/2007 | Roux et al. | |

(Continued)

FOREIGN PATENT DOCUMENTS

| | | |
|---|---|---|
| DE | 10112177 A1 | 9/2002 |
| DE | 10 2006 000 859 | 7/2007 |

(Continued)

OTHER PUBLICATIONS

Boris Balacheff et al. "A Trusted Process to Digitally Sign a Document." NSPW'01, Sep. 10-13, 2002, Cloudcroft, New Mexico, USA.*

(Continued)

*Primary Examiner* — Taghi Arani
*Assistant Examiner* — Narciso Victoria
(74) *Attorney, Agent, or Firm* — J-TEK Law PLLC; Jeffrey D. Tekanic

(57) ABSTRACT

An electronic signature method uses a signature generation unit with a memory that is spatially separated from a data processing device. At least one biometric trait of a person who will electronically sign an electronic dataset is captured, and an electronic biometric dataset is generated based thereon. The biometric dataset is encrypted using a randomly generated value. Subsequently, the encrypted biometric dataset is transmitted to the data processing device, a first checksum is generated in the data processing device for the encrypted biometric dataset and the electronic dataset, and the first checksum is transmitted from the data processing device to the signature generation unit. The random value is encrypted using the first checksum, and the encryption result is further encrypted using the stored key. The result of this is then transmitted to the data processing device.

19 Claims, 6 Drawing Sheets

(56) References Cited

U.S. PATENT DOCUMENTS

2008/0010218 A1    1/2008  Zank
2010/0106973 A1    4/2010  Guenther
2011/0179289 A1    7/2011  Guenther
2011/0185184 A1    7/2011  Guenther

FOREIGN PATENT DOCUMENTS

| EP | 0440914 A2 | 8/1991 |
| EP | 1 014 293 | 6/2000 |
| EP | 1 258 795 | 11/2002 |
| EP | 1944716 A1 | 7/2008 |
| WO | 00/07330 A1 | 2/2000 |
| WO | 01/08352 A1 | 2/2001 |
| WO | 2006/111979 | 10/2006 |

OTHER PUBLICATIONS

Extended European Search Report (EESR) dated Aug. 30, 2010 from priority EP application 10 002 767.1, including translations of the European Search Report and the European Search Opinion.

Directive 1999/93/EC of the European Parliament and of the Council of Dec. 13, 1999 on a Community framework for electronic signatures.

N. Komninos et al., "Protecting Biometric Templates with Images and Watermarking Techniques", Advances in Biometrics, Springer Berlin Heidelberg, vol. 4642, pp. 114-123, Aug. 27, 2007.

U.S. Appl. No. 13/121,665, filed Mar. 29, 2011.

U.S. Appl. No. 13/121,653, filed Mar. 29, 2011.

* cited by examiner

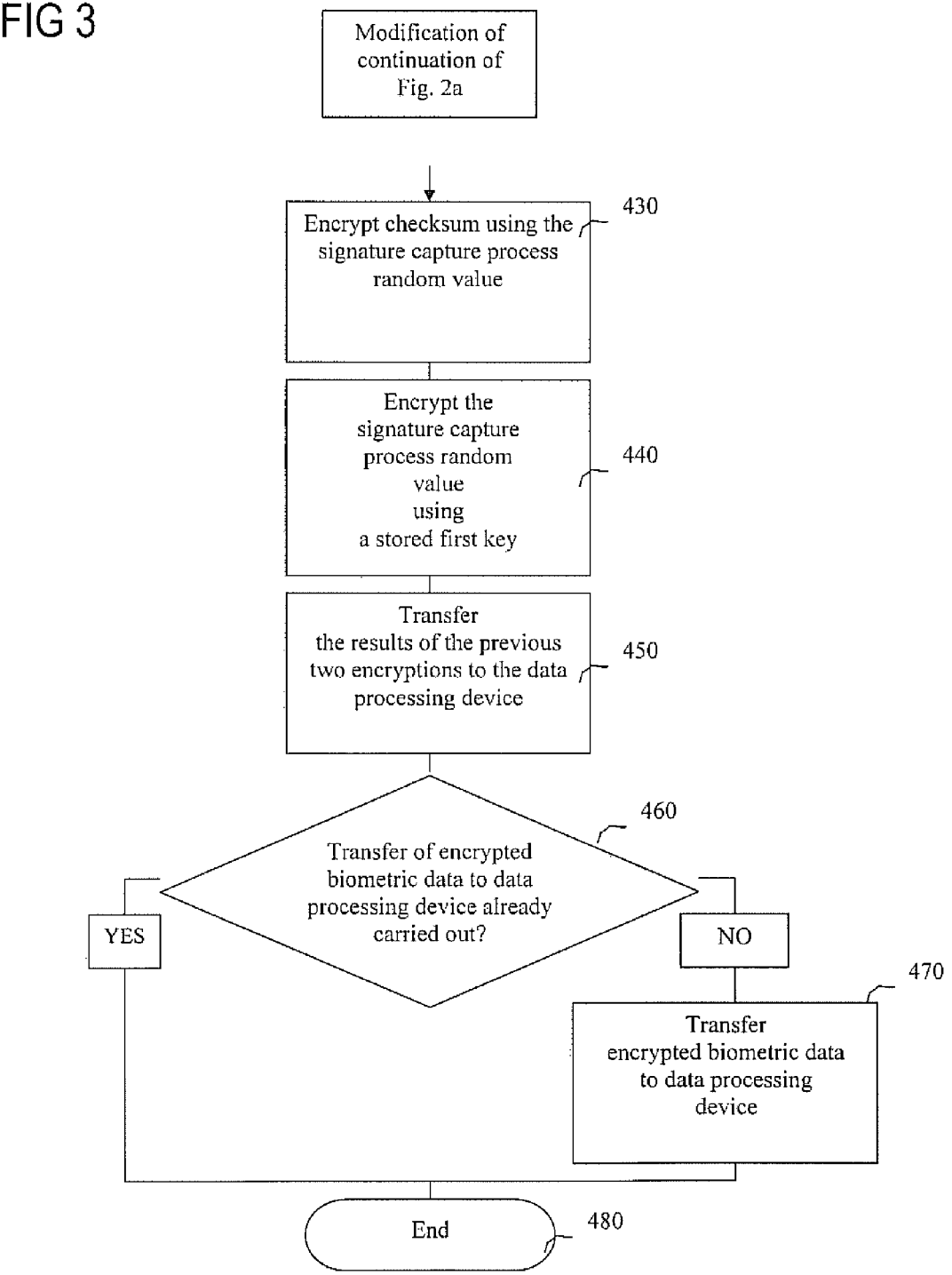

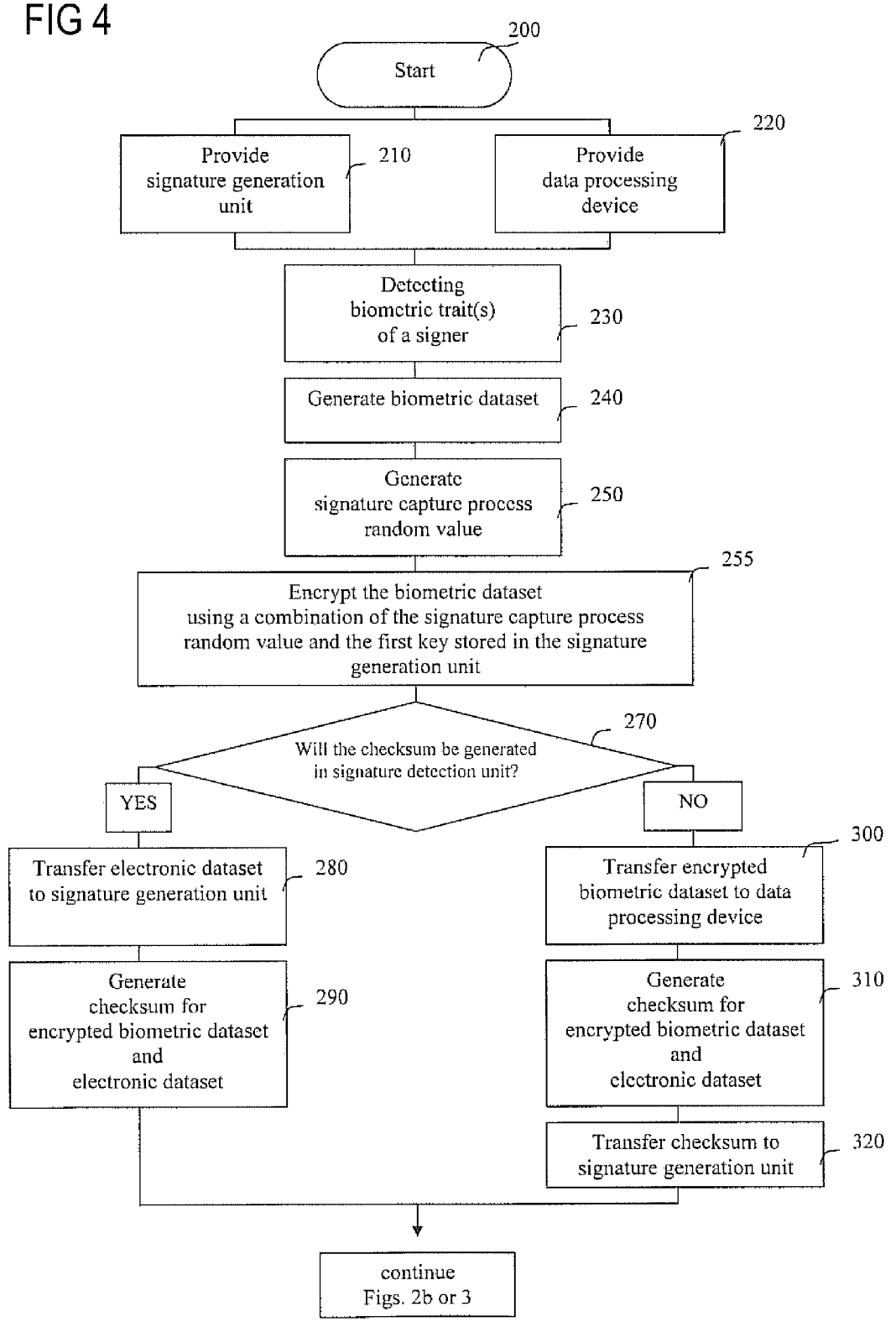

ELECTRONIC SIGNATURE METHOD AND DEVICE

CROSS-REFERENCE

This application claims priority to European patent application number 10 002 767.1, filed on Mar. 16, 2010, the entire contents of which are fully incorporated herein.

TECHNICAL FIELD

In certain aspects, the present invention generally relates to methods and devices for capturing, encrypting and/or using an electronic signature, e.g., to secure electronic data such as a document. In preferred embodiments, electronic signature methods and electronic signature generation units are provided that are capable of using one or more biometric traits of the signer, as well as biometric data based thereon, instead of or in addition to one or more biometric traits of a handwritten signature and biometric data based thereon.

In other aspects, the present invention further generally relates to computer systems for capturing, encrypting and/or using an electronic signature and may comprise a data processing device and a signature generation unit that are capable of bi-directional data communication with each other. In such embodiments, the signature generating unit is preferably spatially separated from the data processing device and configured as a separate unit, which may preferably have a relatively small display device and signature capturing device.

BACKGROUND

As an initial matter, it is noted that a device for capturing, acquiring or detecting at least one biometric trait may be referred to as a 'signature generation unit' in the following. Such a signature generation unit may, for example, comprise one or more technical or hardware devices for capturing, acquiring or detecting at least one biometric trait of a natural person, who will electronically sign an electronic dataset.

Electronic datasets in the sense of the present invention may be any types of electronic documents, for example, and not limited to, PDF files, Word files, XML files, or other files or data that can be processed in a database by known programs or software packages.

The term "transmission" as used herein generally relates to any type of transfer, transmission, sending or conveyance of information from one device to another device. In this respect, a transmission may be effected both via active transmission (e.g., via Bluetooth or W-Lan) and storage and retrieval (e.g., a mass-storage protocol or network attached server 'NAS'). The protocol used in this case (e.g., TCP-IP, HID or proprietary) is as irrelevant as the resulting type of information distribution during transfer, e.g., breakdown into packets of a predetermined size (e.g. in HID or TCP-IP), or transfer as a whole, e.g., as a continuous data stream (as used in a serial interface, mass-storage devices or possibly even proprietary protocols). The transmission medium (e.g., cable, radio waves, infrared, optical fibers, etc.) is also unaffected by this definition.

The term "display area" as used herein basically refers to any kind of technical or hardware device for two- or three-dimensionally displaying electronic data, e.g., an LCD display, TFT display, E-paper display, OLED display, a projection screen, etc. More particularly, any type of known graphical, single-colored or multi-colored visualization device should be understand as falling within the scope of "display area".

The biometric traits may be captured, acquired or detected by any suitable device, e.g., a camera configured to scan or capture, for example, the iris or a fingerprint. Other suitable technical or hardware devices may include: capacitive or resistive touch sensors, load cells or an active pen with position determining devices (for example, a commercially-available graphic tablet or tablet PC with a stylus) for capturing, acquiring or detecting the biometric data of a signature, a microphone for capturing or recording a voice sample, etc. Further, a signature generation unit may also comprise suitable signal processing devices (e.g., chips, processors, memories, etc.), e.g., for carrying out encryption operations. Appropriate electronic biometric datasets are generated based upon the captured biometric traits.

In recent years, many laws and regulations regarding electronic signature of electronic datasets, so-called "electronic signatures", have been passed. A subset of electronic signatures is 'digital signatures', in which, for example, an asymmetric key pair consisting of a secret private key and an associated public key is used (see, for example, known asymmetric encryption methods such as PGP and RSA).

One possible advantage of these asymmetric encryption methods is that data encrypted or signed with an asymmetric key cannot be decrypted with the same key. Instead, the corresponding other asymmetric key of the same key pair has to be used. If a checksum has been encrypted with a private key, the associated public key must be used for its decryption. Only in this manner can the checksum be verified later on.

One possible disadvantage of such digital signatures is that the owner of the signature (i.e. the signor) must carry around a private key (e.g., provided by a certificate supplier) that is associated with the signor. A recipient of the digital signature may then verify the signed document by using the public key, which corresponds to the private key of the sender, and attribute it to the person who signed the electronic document.

An additional or alternative way of using such person-specific asymmetric keys for electronic signature is the use of biometric traits or electronic biometric datasets based thereon. Such biometric datasets may include, for example, a digitalized signature with an image and, when appropriate, one or more of pressure and time elapsed (e.g., signing rhythm), digitalized iris scan, digitalized hand geometry data (e.g., palm print), digitalized fingerprint, digitalized voice sample, etc. All these biometric data can be associated with the signer as part of the electronic signature. In this case, instead of an association of the key pair with the signer, such biometric data serve as one or more characteristics or traits for identifying the signer.

Various methods for linking or associating biometric data with electronic datasets are already known and generally include the encryption of a biometric dataset and the subsequent linkage of the encrypted biometric dataset with an electronic dataset (see, for example, US 2008-0010218 A1, EP 1 944 716 A1 and its US counterpart US 2010-0106973 A1, U.S. Pat. No. 5,297,202, and U.S. Pat. No. 5,195,133). These methods may, however, also exhibit one or more of the following disadvantages.

In methods utilizing only a few encryption steps, the biometric dataset is linked only with the electronic dataset or a checksum (e.g., a hash function, such as, for example, SHA-1, SHA-2, Tiger, SHA-256, etc., performed on the electronic dataset or its display-relevant content). In this case, the checksum may be generated only for the electronic dataset. As a result, a reliable way of verifying whether the encrypted biometric dataset has been manipulated or modified or damaged after the biometric dataset has been linked with the electric dataset might not exist. Further, another possible disadvantage is that an integrity verification of the document always involves the decryption of the biometric dataset. However, a decrypted biometric dataset could be decoupled from the electronic dataset, which was originally electronically signed, and then misappropriated as a blank endorsement (signature) for other electronic documents, because the linkage, i.e. the connection of the biometric dataset to the electronic dataset, is secured only by its encryption.

EP 1 944 716 A1/US 2010-0106973 A1 also discloses the use of a plurality of checksums and the use of two asymmetric key pairs in order to, on the one hand, safeguard the association of the biometric dataset with the electronic dataset and, on the other hand, to also safeguard the integrity of the biometric data by using a second checksum.

In the first method, when the biometric dataset is decrypted and verified, it can only be determined whether the biometric dataset is intact. The second type of method requires a relatively high computing speed to carry out the plurality of encryptions of the plurality of checksums, mostly with the aid of a plurality of asymmetric key pairs. For this reason, this type of method is currently offered mostly only for use with a fully equipped computer, i.e. a data processing device. A computer, however, is regarded as an insecure environment, because keys stored or archived there might possibly be read out or downloaded und/or the operation itself might be affected by Trojan horses or hackers. Moreover, in this multiple-step method, a question is often raised whether a second checksum that represents the electronic document and the biometric dataset contained therein actually pertains to the original document, as the key used for encryption, e.g., a private key, is different from or belongs to a second asymmetric key pair than the key used to secure the biometric dataset as well as the linkage of the biometric dataset with a first checksum. A relatively complex logistical effort can result in the mapping of the key pairs to each other or to the signature device or computer used. This may render a method complex and in need of much explanation.

All methods may have in common that the first checksum safeguards the integrity of the electronic dataset. However, this particular checksum, which is directly connected with the encrypted biometric dataset and the process for capturing the biometric data, should also safeguard the integrity of the encrypted biometric dataset, as only this dataset can be indisputably associated with the capturing process. Hence, this first checksum is the only indisputable evidence for the integrity and the matching of the electronic dataset and the identifying trait and/or the authorization of the signer—with the assistance of the encrypted biometric dataset.

A second checksum may also safeguard the integrity, because it is not securely linked with the biometric dataset according to the known methods. However, this second checksum may not safeguard the matching or association, i.e. the second checksum may possibly only ensure that the encrypted biometric dataset secured therewith are unmodified after having been generated. Thus, this second checksum may not yield a reliable conclusion as to whether these encrypted biometric traits were actually captured at the time of signing of this electronic dataset.

All previous methods may further have the disadvantage that, in an environment in which not only an electronic signature is carried out but also in which the signer should be automatically identified, the biometric traits have to be transmitted to a verification engine (in most cases, software on a computer or server) for the identification operation without having a linkage with the electronic dataset. At this particular point in time, however, the biometric data may be intercepted or copied and possibly misappropriated for some other purpose.

Up to now, the only alternative has been the possibility of shifting the entire verification, i.e. the comparison of biometric traits with reference samples, into the signature generation unit, with which the biometric traits are captured. In practice, however, the required computing speed, as well as the transmission of the reference samples into the signature generation unit and/or the secure distribution thereof to all necessary signature generation units, are an obstacle to such an approach. In the context of banking applications, for example, it cannot be assumed that the customer to be verified will always go to the same branch or even use the same signature generation unit at the branch.

Moreover, the main focus may be on the efficiency of the method, so that it is not required to be carried out on a high-speed, but insecure computer, but rather, for the most part, in a secure device with a slower computing speed that also simultaneously captures biometric data.

The present teachings may be utilized to solve one or more of the above-mentioned problems, or at least to provide an improved approach for solving one or more said problems, or even other problems not mentioned herein.

SUMMARY

According to a first aspect of the present teachings, a method for generating, creating and/or using an electronic signature is disclosed and preferably uses a signature generation unit comprising a memory that cannot be read out from outside of the signature generation unit. A first (encryption) key is stored this memory, which is thus readable internally only within the signature generation unit. The signature generation unit is configured to bi-directionally communicate data, e.g., via wire or wirelessly, with a spatially-separate data processing device, and to carry out an encryption method by using the key stored in the signature generation unit. Further, a data processing unit of the data processing device is configured to provide an electronic dataset (e.g., a document in electronic form) to be signed using the signature generation unit. According to the present teachings, at least one biometric trait of the person who will electronically sign the electronic dataset is captured by the signature generation unit. This at least one biometric trait may be a trait of the signature, such as, for example, a pressure curve, etc., and/or a biometric trait of the person him- or herself, e.g., an iris image, etc. In the signature generation unit, an electronic biometric dataset is generated from the at least one captured biometric trait. Further, a signature detecting process random value is generated in the signature generation unit and the generated biometric dataset is encrypted in the signature generation unit using the generated signature capture process random value.

According to a first alternative, the biometric dataset encrypted according to the above-described embodiment are transferred or transmitted to the data processing device. In the data processing device, a first checksum is generated for the encrypted biometric dataset and the electronic dataset, and the first checksum is transferred or transmitted from the data processing device back to the signature generation unit. In an alternative approach, the electronic dataset is transferred or transmitted from the data processing device to the signature generation unit, where the first checksum is generated for the encrypted biometric dataset and the electronic dataset.

Both alternatives have in common that the generated signature capture process random value is encrypted in the signature generation unit by using the first checksum, and that this encryption result is then encrypted using the first key stored in the signature generation unit. The result of the last encryption is then transferred to the data processing device.

An electronic signature method according to the present teachings may securely connect or link biometric data of a handwritten signature and/or further biometric data of a signer with the electronic dataset to be signed. By connecting the biometric data of the signer with the electronic dataset to be signed, it may also ensure that any subsequent modification or manipulation of the electronic dataset, as well as any subsequent modification or manipulation of the associated biometric data, can be reliably recognized. Moreover, the biometric data utilized for the automated identification of a person can not exist in a manner, in which the biometric data are not separately entirely unencrypted; the biometric data can only exist, for example, linked with the associated electronic dataset. Despite the use of the at least one biometric trait for the identification of the person, it is possible according to the present teachings to securely sign an electronic document with the same biometric data.

Thus, according to one aspect of the present teachings, a simple, comprehensible, secure and efficient method can be provided that only requires a low or slow computing speed. Thus, such a method may also work well with small "slow speed" processors in an external signature generation unit. It is typically more difficult to manipulate or "hack" such a processor in an external signature generation unit than software on a computer, such as a network-connected server. Hence, the at least one checksum may not only ensure the integrity of the electronic dataset but also the integrity of the encrypted biometric dataset. Consequently, the number of required encryption steps and the number of required checksums may be reduced as compared to known electronic signature methods. More particularly, an asymmetric encryption, which has been used up to now, may only require a relatively slow computing speed without sacrificing the overall speed and efficiency of the process.

Therefore, the use of one or at most two checksums, and the preferably the minimal use of an asymmetric key for each electronic signature can be sufficient. Moreover, the checksums used should also secure the integrity of the encrypted biometric dataset, in particular when the checksum is directly connected with the biometric dataset, as only this checksum can be definitely connected with the biometric data capture process.

In principle, the biometric dataset should be connected with a checksum that is based both on the content of the electronic dataset and on the encrypted biometric data. This precondition is probably not fulfilled by the above-mentioned known methods, because the checksum used was required to exist before encrypting the biometric dataset in order to encrypt the checksum together with the biometric dataset, or in order to use this checksum or the entire electronic dataset itself for encryption. In certain aspects of the present teachings, this problem can be solved by using, inter alia, a common password, which is, however, unique for each signature capture process, or by generating a secure random value, which is unique for each signature capture process, e.g., a random sequence of symbols that is generated in the signature generation unit and cannot be read from outside of the signature generation unit, for encryption of the biometric dataset and the checksum. This random value or password may simultaneously also serve to link the encrypted biometric dataset with the checksum. Thus, a direct linkage or a combination and/or encryption of the checksum with the biometric dataset may become unnecessary. In this case, the two values may be encrypted at different times, i.e. the checksum may also be generated after encryption of the biometric dataset and thus fulfils the requirement to secure the biometric dataset, because the checksum may now also be generated at a later time, i.e. after the encrypted biometric dataset is available. The relatedness of the biometric dataset and the checksum can, nevertheless, be re-determined using the common key, e.g., the signature capture process random value.

During the encryption of the checksums, attention should also be paid to whether, in fact, the correct checksum is encrypted and/or whether the signer actually wanted to sign the particular electronic dataset. Therefore, according to another aspect of the present teachings, it may be advantageous to provide optimal methods that enable the signer to cross-check the checksum between, e.g., the computer and the signature generation unit, and/or to view the electronic dataset (document) in the "secure" signature generation unit.

Optionally, the signature generation unit may also be used as a "secure" input medium which, for certain operations, requires the authorization of the signer, and does not carry out the necessary operation in the event that the authorization is denied, thus ensuring that the actual will of the signer cannot be ignored, independently of any possible manipulation, for example, on the connected computer.

The use of multiple checksums and multiple asymmetric key pairs as is, for example, described in the above-mentioned EP 1 944 716 A1 (US 2010-0106973 A1) may provide the advantage that a recipient can check the integrity (i.e. the intactness or non-modification) of the electronic dataset without requiring the key, e.g. a private key, of a second asymmetric key pair, which key would also enable the recipient to decrypt and possibly misappropriate the biometric data of the signer. On the other hand, according to the present teachings, only one encryption per signature capture process may be carried out, e.g., an asymmetric encryption with a public key or private key, but nevertheless, both the integrity of the electronic dataset including the encrypted biometric dataset (e.g., by encrypting the checksum using the key) and the encryption of the biometric dataset should be safeguarded. Therefore, the person who has the key for decrypting the checksum and for verifying the integrity of the electronic dataset, including the encrypted biometric dataset contained therein, also has the opportunity to use this key to decrypt the biometric dataset. However, if the biometric dataset is decrypted, the linkage of the biometric dataset with the electronic dataset, which linkage is safeguarded only by the encryption, could be broken or eliminated. The biometric dataset could then possibly be misappropriated as a "blank endorsement (signature)". However, the person verifying the integrity of the electronic document is typically the recipient of the signed electronic document, i.e. not the signer or owner of the biometric data. The latter, however, usually does not want to enable the recipient to misappropriate his biometric data. In a further aspect, the present teachings therefore enable the encrypted biometric dataset to be stored or archived at a different location (e.g., at a neutral storage location of a neutral third party) than the encrypted dataset used for the integrity verification (e.g., the checksum). Thus, the person who wants to verify the integrity of the electronic dataset can possess the key required for decrypting the checksum. However, because this person has no access to the biometric dataset archived at a different location, he/she can not use the key to decrypt the biometric dataset in an inappropriate manner.

The previously known methods, however, either store the checksum required for the integrity verification encrypted together with the biometric dataset or use the checksum itself as key or part of the key for encrypting the biometric dataset.

In order to eliminate the need for an associated storage and encryption of the biometric dataset and the checksum, according to the present teachings, a signature capture process random value is preferably generated and used. This random value can be used temporarily as well as for "locally" separated encryption of the checksum and the biometric dataset.

However, because an integrity verification of an electronic dataset using a decrypted "original checksum" is only possible when a checksum is generated for comparison anew for the same existing data, the above-described approach according to the present teachings could appear to pose a problem. Therefore, the above-described exemplary aspect of the present teachings proposes that the checksum not only safeguards the integrity of the electronic dataset but also the integrity of the associated biometric data. This could, however, imply that the checksum must be generated both for the content of the electronic dataset and for the encrypted biometric dataset. This circumstance could occur both in a verification and in the generation of a second comparison checksum, even in case that, as mentioned with regard to another aspect of the present teachings, the encrypted biometric dataset is stored such that the person performing the verification has no direct access thereto.

In order to solve this technical problem, it is proposed according to a further aspect of the present teachings to use an "intelligent storage location" for the encrypted biometric dataset, wherein the dataset is not only stored, but also the generation of a checksum for this dataset is made possible, without giving the person performing the verification access to the encrypted biometric dataset that could otherwise be decrypted by this person using the same key. In this regard, it should be ensured that the operator of the storage location also should have no possibility or opportunity to decrypt the encrypted biometric dataset consigned to the operator.

According to a further exemplary aspect of the present teachings, encryption of the biometric dataset may be carried out using an additional private key, e.g., a sequence of symbols. This private key, which is stored in the signature generation unit and cannot be read out from outside of the signature generation unit, may be a sequence of symbols, e.g., a password. The secret sequence of symbols may be the same for a plurality of signature generation units, or it may differ for each manufacturing lot or even for each signature generation unit. For decrypting the biometric dataset, not only the signature capture process random value that is accessible for the person performing the verification, but also the secret sequence of symbols, may be required. Thus, on the one hand, it can be further ensured that the checksum belongs to the electronic dataset in question and the biometric dataset, as both of them can only be decrypted using the same signature capture process random value. Nevertheless, the signature capture process random value alone is not enough to decrypt the biometric dataset. Thus, according to this aspect of the present teachings, the storage of the biometric dataset at a third location may be unnecessary. The person who wants to verify the electronic document may nevertheless be unable to decrypt the biometric dataset. However, no additional encryption processes or a second asymmetric key pair may be required.

A further exemplary aspect of the present teachings for possibly avoiding the need to store the biometric dataset at another (secure) location other than the data processing device may be to use an asymmetric key of the signature generation unit for encrypting a second checksum. This approach may have both advantages and disadvantages as compared to the previously explained aspect, and may be viewed as a possible exemplary alternative. A possible advantage of a later-generated second checksum is that it thereafter not only secures the content of the electronic dataset in addition to the encrypted biometric dataset and the encrypted first checksum which, according to an exemplary embodiment of the present teachings, is based in principle only on the content of the electronic dataset and the encrypted biometric data, but also secures the encrypted signature capture process random value required for decrypting the biometric dataset and the first checksum. A further possible advantage of this exemplary alternative could be that a person who will perform the verification can decrypt the second checksum using the asymmetric key corresponding to the asymmetric key stored in the signature generation unit, but is not able to decrypt the signature capture process random value and, thus, the encrypted biometric dataset using this key. A possible disadvantage of this approach could be that the association of the encrypted biometric dataset with this document cannot be readily re-determined solely by verifying the second checksum. Although the second checksum is also based upon the encrypted biometric dataset contained therein, whether the latter were also captured for this document can be simply and obviously established only with the aid of the first checksum that is linked to the biometric dataset. In this approach, it may further have to be clarified, with what the signature capture process random value (which serves as the key for the biometric dataset and the first checksum) is encrypted. For this purpose, the use of a second asymmetric key of a second asymmetric key pair could be proposed. It is noted that such an approach could also be applied to the previously described exemplary methods of the present teachings. However, this may not be a preferred solution for speed reasons, i.e. due to the computing speed required therefor.

The possible computing speed problem could, however, be solved according to the exemplary aspect of the present teachings described in the following. In this regard, it is noted that the first checksum might be unnecessary both in this exemplary aspect of the present teachings and in the subsequent further exemplary embodiment of the present teachings, if the second checksum is either encrypted together with the signature capture process random value using the first asymmetric key of the first asymmetric key pair, or if the second checksum is encrypted by the signature capture process random value before it is encrypted using the above-mentioned asymmetric key. In both cases, the checksum would, therefore, be linked with the biometric dataset via the signature capture process random value. In this embodiment, however, in order to ensure that the biometric dataset cannot be easily decrypted by the person carrying out the verification, a secret sequence of symbols must be used again when the biometric dataset is encrypted. A disadvantage could be that a checksum, which is encrypted and/or linked in this manner, is not compatible with standard programs for verifying digital signatures. In contrast, in this aspect of the present teachings, the use of a second checksum, which checksum is encrypted with only one asymmetric key, enables, e.g. PDF documents, to be signed such that at least the integrity of the document can be verified using commonly-available verification mechanisms (e.g., PPKLite in Adobe Acrobat or Adobe Reader).

In order to render a method according to the present teachings as described above as efficient as possible, i.e. less computationally intensive, a secret sequence of symbols in the signature generation unit could be used for encrypting the signature capture process random value as an alternative to the use of a second asymmetric key. In this case, only persons who know the secret sequence of symbols may decrypt the signature capture process random value and, thus, the first checksum and the biometric data. Nevertheless, the most computationally-intensive step of a second asymmetric encryption for each "signing" is avoided. The use of such a secret but static sequence of symbols (which always, or at least for a long time, stays the same for each signature generation unit) may have the disadvantage that all biometric datasets encrypted by the signature generation unit could be decrypted in the event that this static "secret" sequence of symbols would become known. Moreover, such a "general key" should never be kept by the manufacturer of the device. In addition to security aspects, there is also the question of whether the manufacturer will still be in existence in the distant future when the biometric dataset may have to be decrypted in order to verify an identity or the integrity of an electronically-signed document. A solution to this problem could be that the signature generation unit is provided with a second asymmetric key of a second asymmetric key pair, but that this second asymmetric key has to be used only once or periodically and, therefore, does not require a fast computing speed and/or a long waiting period per "signature". This is because the signature generation unit itself generates the secret sequence of symbols according to another exemplary embodiment of the present teachings (i.e. it is not predetermined or installed by the manufacturer, and is also not known to the manufacturer). After the secret sequence of symbols is generated, it is non-readably stored in the signature generation unit, so that this sequence of symbols can be later used to encrypt the signature capture process random value. Then, the signature generation unit uses the asymmetric key of the second key pair and encrypts the secret sequence of symbols therewith. This encrypted result is, however, readably stored in the signature generation unit, or transmitted each time together with the encrypted biometric dataset, so that it can be stored together with the biometric dataset. Therefore, if it is desired to decrypt the biometric dataset, the signature capture process random value is required for this purpose. In order to decrypt this random value, the secret sequence of symbols is required, and in order to decrypt this symbol sequence, the asymmetric key that corresponds to the second asymmetric key of the signature generation unit is required, which may, for example, be archived at a notary. This aspect of the present teachings could have the advantage that a second asymmetric encryption has to be carried out only periodically, or even only once (i.e. only in case the signature generation unit generates a new secret sequence of symbols). Moreover, only one asymmetric key has to be archived (e.g. at a notary), although each signature generation unit uses a different, or even periodically changing, secret sequence of symbols for encrypting the signature capture process random value. Furthermore, in case of a legal dispute, the party keeping the corresponding asymmetric key, for example the notary, does not have to release the decrypted secret sequence of symbols, which sequence could be used for decrypting a plurality, or even all, of the biometric data captured by that signature generation unit. The notary can keep the secret sequence of symbols confidential and use it to decrypt the signature capture process random value of the signature in question. The notary may release this signature capture process random value, which may be unique for each signature capture process, only to the appropriate authorized experts. According to this exemplary aspect of the present teachings, because a time-consuming asymmetric encryption is not required for securing and linking of the first checksum and the biometric dataset for each data capture, this method is also suitable for combination with a second checksum that is encrypted using an asymmetric key of a second asymmetric key pair, such that it can be used in standard programs (e.g., Adobe PKKLite) for verifying a digital signature (i.e. for verifying the integrity of the document).

In the following, the second asymmetric key, which corresponds to the first asymmetric key (i.e. the key for decrypting the second checksum, which key is required by the person carrying out the verification or, for example, a recipient of the signed electronic document), may also be referred to as a verification key. This second asymmetric (verification) key may also be readably stored in the signature generation unit or may be output by the signature generation unit together with the encrypted data, so that the verification key may be stored together with or in the electronic dataset. Hence, a person carrying out the verification may be provided with this verification key together with the signed electronic dataset. Further, it is noted that this "verification key" may, for example, also be associated with a signature generation unit (e.g., its serial number), or the manufacturer of the device, or the owner thereof etc. by a certificate. In this way, a person carrying out the verification may determine that the verification key, which is supplied therewith if necessary, is actually the asymmetric key that corresponds to an asymmetric key located in a "secure" signature generation unit (if necessary, even in a separate signature generation unit).

As is readily derivable from the above-explained embodiments of the present teachings, an improved or increased security can be connected with the increased shifting of the method steps into the signature generation unit in an electronic signature method, because it is much more difficult to manipulate or "hack" the signature generation unit than the data processing device. In practice, however, the limited computing speed of such a device may counsel against the above-noted shifting of the method steps (insofar as the device should be affordable and easy to operate, i.e. insofar it should be battery-operated or should be operable via an USB connection with the limited amount of available energy, and insofar as the signature generation unit should operate quickly and not require much time for the calculations for each data capture process).

If maximal security should be achieved, not only encryption of the biometric dataset and the linkage and encryption of the checksums should be carried out in the signature generation unit, but preferably also the generation of the checksum for the electronic dataset, as well as the display thereof and the processing required for display. This modification of the disclosed methods according to the present teachings is possible; depending on the type of electronic dataset. However, it may be difficult or even impossible to implement it in practice due to the limited computing speed. This is especially the case with very complex electronic datasets, such as e.g., PDF files.

The generation of the representation (rendering) of a PDF file can be extremely computationally-intensive. However, the signer may not necessarily have to sign the electronic dataset itself (in this example, the PDF file). It would be sufficient if he/she signs the displayable content, e.g., the result of the PDF rendering or, for example, one or more Bitmaps, JPGs or PNGs or any other form that requires little or no processing power in the signature generation unit, which may be shown on an image display of the signature generation unit. Thus, according to a further aspect of the present teachings, it is proposed that the electronic dataset itself is not signed, but rather only its displayable content. In practice, the "insecure" computer could, therefore, undertake the computationally-intensive work, e.g., processing (i.e. for example, rendering) the complex electronic dataset (in the example the PDF data file) for display. This displayable content (e.g., one or more Bitmaps, JPGs or PNGs) can then be transmitted to the signature generation unit and displayed there. The signer could then read or look at this content on the display and sign it according to one of the above-described methods. The difference is that the signature generation unit would no longer generate the checksum for the electronic dataset itself, but rather for the form that has been loaded into the signature generation unit and processed for display (i.e., in the present example, for one or more Bitmaps, JPGs or PNGs).

In the integrity verification, the displayable content would then again be prepared from the electronic data set in question, and the checksum required for verification would be generated only for this displayable content in order to compare it with the checksum generated and decrypted by the signature generation unit. As a result, the checksum would no longer safeguard the integrity of the electronic dataset and the encrypted biometric data, but rather it would safeguard the integrity of the representation of the electronic dataset visible to the signer and the encrypted biometric dataset. In many cases, this kind of security may be completely sufficient as, in many cases, it can be assumed that the signer only wanted and could sign what was displayed to him/her. In the alternative, the displayable content, which was displayed on the signature generation unit and for which the signature generation unit generated the checksum, could be stored or archived together with or in the electronic dataset, so that it does not have to be newly generated when a verification is subsequently performed. This approach can be expedient if one is not certain whether an identically-displayable content, which is precise to one bit, can be generated from the existing electronic dataset in a couple of years or even decades later using a future operating system.

In some fields of application, e.g., in the banking field, a recipient may verify the electronically signed dataset not only based upon its integrity, but also the recipient may want to verify whether the association of the biometric trait, i.e. the biometric data, with the signer is proper (e.g., a withdrawal slip at the bank teller). In order to automatically carry out such a verification, so-called "verification engines" are typically used. A verification engine compares the newly captured biometric data with an archived reference sample and determines, based upon similarity, if the reference sample actually corresponds to the newly-captured biometric trait of the particular person. Such verification engines (usually a software program) already exist for various biometric traits (e.g., fingerprints, signatures, voice samples, iris scans etc.). However, when using such a method, the operator of the system (e.g., the bank) is always confronted with the problem that the biometric dataset of the signer must be sent to the verification engine in a usable form, i.e. unencrypted and, therefore, not linked to a specific electronic dataset. In this situation, however, the operator or a third party might be able to get a copy of the biometric dataset, which could be also misappropriated as a "blank endorsement (signature)" due to the lack of connection with a specific electronic dataset and due to the lack of encryption. An operator of such a verification engine who also wants to use the biometric dataset of the signer for secure electronic signatures is, therefore, confronted with the problem of how to prove that a specific biometric trait of a signer was actually provided for signing a specific electronic dataset, and that it is not simply a copy of a biometric trait of the signer, which has been provided by the signer exclusively for the verification.

This problem may be solved by a further exemplary embodiment of the present teachings, in which the signature generation unit calculates a mathematical abstract of the biometric dataset required for the automated comparison, and only supplies this mathematical abstract in an unencrypted form. In the following, this will also be referred to as "BioRef" (abbreviation of "biometric reference"). As a starting point, naturally, the generation of a checksum is considered again here. However, checksums are identical only if the dataset for which they are generated is also identical to one bit. This, however, usually does not apply with respect a biometric trait. Although, in most cases, a signature can clearly be associated with a person by visual comparison, each signature of the person differs and is never completely identical with previous signatures. Therefore, the BioRef is an abstract mathematical expression of arbitrary aspects of the biometric data. It must, however, not be sufficient to completely reconstruct the biometric data (e.g., the fingerprint, the digitalized signature, etc.) based thereon. The BioRef must, however, be sufficiently unique in order to enable the verification engine to carry out the comparison with other already-captured mathematical expressions/abstracts of the biometric trait of the signer. In the case of a digitalized signature, such a BioRef could, for example, consist a percentage or ratio of the dominant writing direction(s) relative to the entire time taken to write the signature (e.g., 90% to the right, 7% upwards, 2% to the left, 1% downwards). Moreover, the pressure could be represented in one or more of the following possible ways: the difference between minimum pressure and maximum pressure 200%, average pressure in relation to maximum pressure 50%, average pressure curve from beginning to end of the signature is increasing or decreasing, etc. In this manner, sufficient dynamic parameters such as pressure, acceleration, writing direction, etc. could be converted into characteristic traits that are unique for the biometric trait of one person, but are not suitable for reconstructing the biometric data in a manner such that an expert (in case of a digitalized signature, for example, a handwriting expert) could not distinguish such a reconstructed biometric trait from the real biometric trait. Of course, much more complex mathematical methods also could be used when generating such a BioRef, e.g., methods representing writing pressure curves or the number of enclosed areas in the signature (e.g., in an O or P), etc. The only important thing is that one BioRef contains a sufficiently large sum of abstract traits of the biometric data in order to supply a verification engine with sufficient distinguishing traits, but without representing the biometric data such that the biometric data could be reconstructed based on the BioRef.

BRIEF DESCRIPTION OF THE DRAWINGS

FIG. 4 shows an alternative embodiment of the first part of the flow chart shown in FIG. 2a, which may be used with either of the representative methods according to FIG. 2b or 3.

DETAILED DESCRIPTION

First Embodiment

Figure 1:
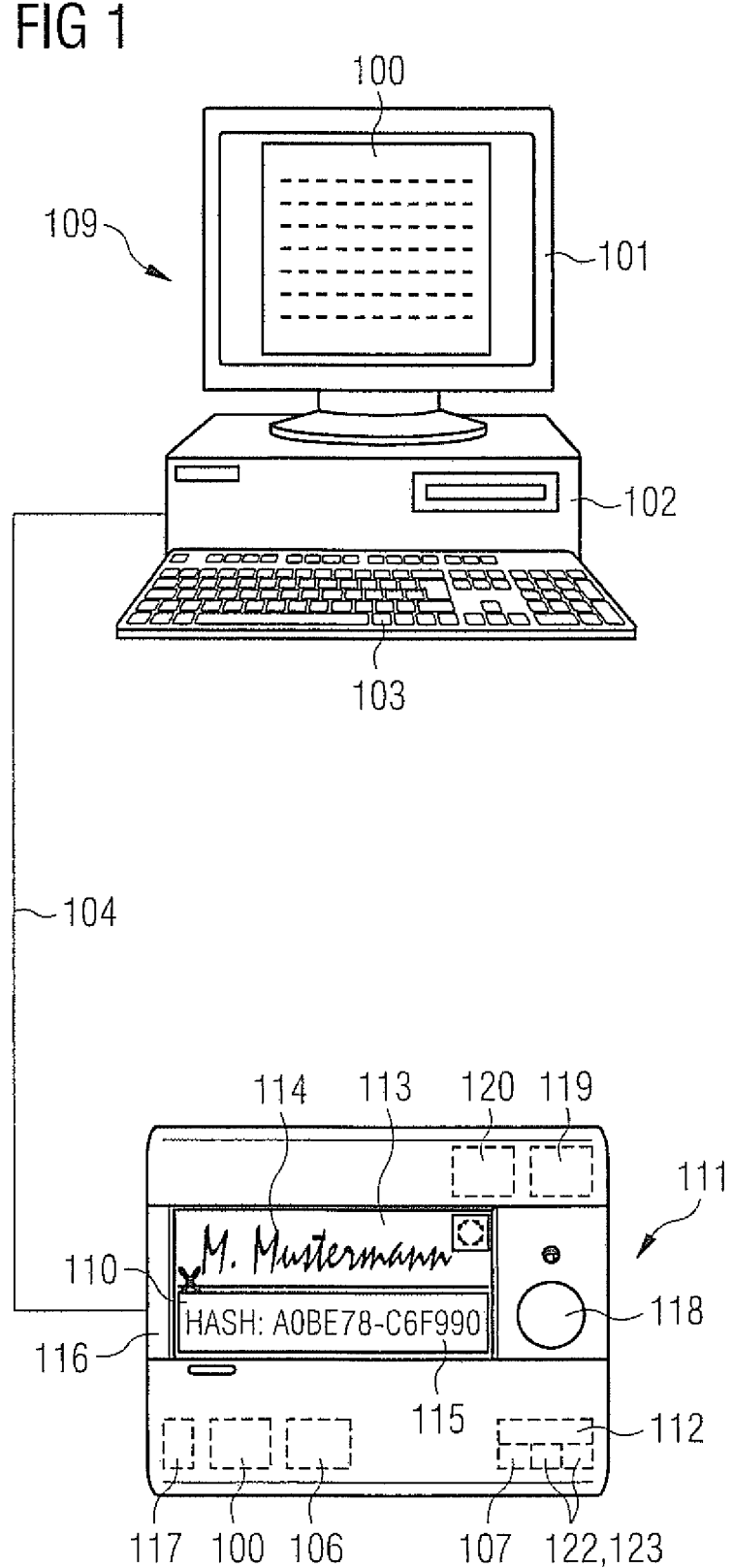
FIG. 1 schematically shows an exemplary embodiment of a computer system having a data processing device and a signature capture unit according to a representative embodiment of the present teachings.

FIG. 1 schematically shows an exemplary, non-limiting embodiment of a computer-based system that may be used with the present teachings. The computer system basically comprises a data processing device 109 and a signature generation unit 111 which may be in bi-directional communication with the data processing device 109, for example, via a wire 104. In the alternative, the two devices 109 and 111 may also communicate via some other means, for example via a wireless connection, e.g., Bluetooth or Wi-Fi (preferably encrypted), or another communication protocol, for example via infrared.

The data processing device 109 comprises a monitor 101 where, for example, the electronic document 100 to be electronically signed can be displayed. The monitor 101 is connected with the actual computer 102 which may be, for example, operated via a keyboard 103 or other data input means, e.g., a mouse, touchscreen, stylus, etc.

The signature generation unit 111 may comprise a display 113 on which a person may, for example, input his/her signature 114 by signing as if it were on paper. The signature can be captured, acquired or detected by appropriate sensors disposed in the signature generation unit 111, as was described in more detail above. The process for capturing the signature 114 may also include, for example, the capturing of one or more biometric traits of the signature, such as, for example, a curve of the applied pressure over time, the signing rhythm, etc., as was also described in more detail above. Optionally, a checksum 115 may be displayed on the display 113. A data communication device 116 in the signature generation unit 111, together with the wire 104, enables bi-directional communication with the data processing device 109 according to any suitable known data communication protocol.

A memory 112 is provided, which cannot be read out from outside of the signature generation unit 111, and wherein, for example, a key 122, 123 may be stored. In addition, other temporarily or permanently available data or keys may also be stored in the memory 112.

A device or functional portion 119 configured to generate a signature capture process random value may also be provided.

Further, a biometric data capture or detection device 118 may be configured to capture and/or detect at least one of the above-noted biometric traits of a natural person who will be signing the electronic dataset, and to generate an electronic biometric dataset based upon the captured data. Representative, non-limiting examples of such capture devices and/or the types of biometric traits that may be captured according to the present teachings were described above.

An encryption device 117 may be configured to perform an encryption method using one or more keys 122, 123 stored in the signature generation unit 111. The encryption device 117 may be further configured to decrypt the generated biometric dataset using a random value that is generated by the signature capture process random value apparatus 106. In addition, the encryption device 117 may be configured to encrypt the generated signature capture process random value in the signature display unit 111 using the first checksum. The encryption device 117 may also be configured to encrypt the signature capture process random value encrypted using the first checksum by using the key 122, 123 stored in the signature generation unit 111.

Figure 2A:
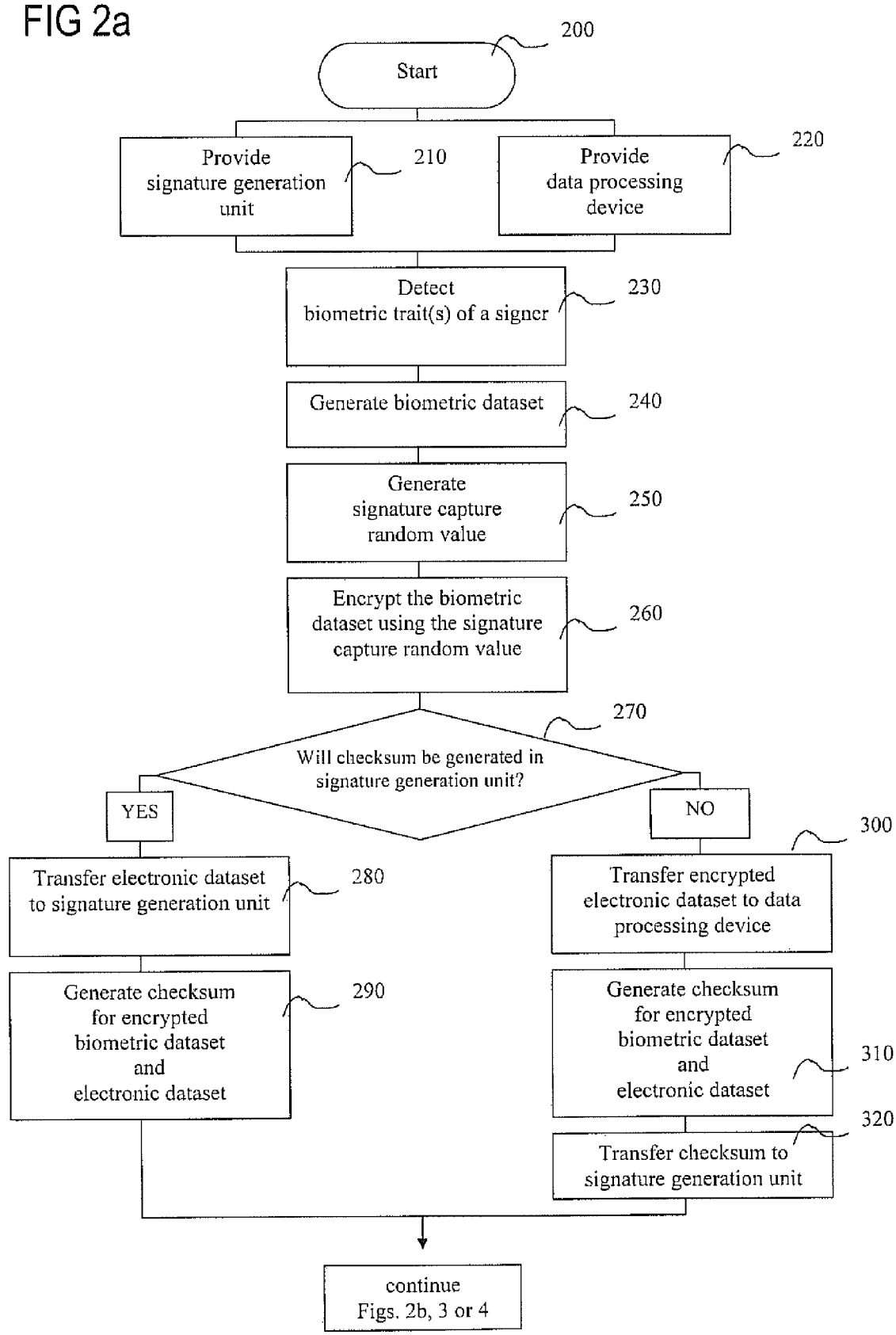
FIG. 2a shows a first part of a flow chart of a first representative method according to the present teachings.

A first exemplary embodiment of a method according to the present teachings, which may, for example, be carried out using a computer-based system as shown in FIG. 1, will be explained below with the assistance of the flow chart shown in FIGS. 2a and 2b. It should be understood that the individual method steps do not necessarily have to be carried out in the stated order. In addition, two or more method steps may also be carried out simultaneously or in a different order. After start of the routine, the signature generation unit 111 and the data processing device 109 are provided, step 210 and 220, respectively.

At least one biometric feature, trait or characteristic of a natural person who will electronically sign the electronic dataset (document) 100 is detected, acquired or captured using the signature generation unit 111, step 230. An electronic biometric dataset 104 is generated in the signature generation unit 111 based upon the captured biometric dataset, step 240. In step 250, the random value generator 106 of the signature generation unit 111 generates a signature capture process random value. In step 260, the biometric dataset is encrypted using the signature capture process random value.

In an alternative embodiment shown in FIG. 4, the biometric dataset is encrypted in step 255 by using a combination of the signature capture process random value and the first key stored in the signature generation unit 111, e.g., an asymmetric key.

In step 270, it is queried where the checksum should be generated. In case the checksum will be generated in the signature generation unit 111, the electronic dataset is transmitted to the signature generation unit 111 in step 280, and then the checksum is generated for the encrypted biometric dataset and the electronic dataset (100) that is combined therewith, step 290.

On the other hand, if the checksum will be generated in the data processing device 109, the encrypted biometric dataset is transmitted to the data processing device 109 in step 300 and the checksum is generated there in step 310. The external data processing device 109 then transmits the generated checksum to the signature generation unit 111, step 320.

Optional Method Step a:

Optionally, the signature generation unit 111 may now visually display the checksum, in the event that the signature generation unit 111 is provided with a display device or a display area 110. In this case, the entire checksum or, for faster comparison, an abbreviated representation of the checksum, may be displayed. This optional step may be particularly advantageous if the checksum is generated in the data processing device 109. In this case, the signer, i.e. the person whose biometric data were captured by the signature generation unit 111, can compare the checksum in the signature generation unit 111 with the checksum displayed on the data processing device 109 and thereby ensure that the transmission of the checksum from the data processing device 109 to the signature generation unit 111 has not been manipulated. Further, the signature generation unit 111 could additionally provide a confirmation prompt, e.g., in the form of a message box having an OK button and a cancel button. It is an aim of this approach to repeatedly draw the signer's attention to the displayed checksum, and to obtain confirmation that he/she is aware of the checksum and, if necessary, has compared it to the checksum displayed on the data processing device 109. In case the signer refuses to confirm, the signature generation unit 111 may automatically interrupt the process, i.e. it could, for example, interrupt the encryption or simply not transmit the required data to the data processing device 109. This would ensure that a data processing device 109, which may not be secure, cannot simply ignore the signer's refusal to confirm that the transaction is proceeding properly.

Optional Method Step b:

If the signature generation unit 111 is provided with an appropriate display device or display area 100, it could optionally, in addition, or as an alternative, also display the electronic dataset (document) 100 itself, or at least relevant parts of the electronic dataset. In case relatively long electronic datasets 100 will be displayed, e.g., an electronic document comprising a plurality of pages, the signature generation unit 111 could be additionally provided with one or more control elements for maneuvering within the long dataset 100 (e.g., scrolling) and/or to flip through a multi-page dataset 100 and/or for varying its display size (e.g., zoom). Such a configuration may be particular advantageous in case the electronic dataset 100 for generating the checksum in the signature generation unit 111 has been transmitted from the data processing device 109 to the signature generation unit 111. Thus, the signer himself/herself may view on the signature generation unit 111 whether the correct electronic dataset 100 has been transmitted. However, even in case the checksum for the electronic dataset 100 is not generated in the signature generation unit 111, the display of the dataset 100 in the signature generation unit 111 may provide additional security. Of course, these optional features may be optionally combined with the display of the checksum, as was described above.

Optional Method Step c:

As a further optional alternative, if the signature generation unit 111 comprises a display device or a display area 110, it could also visualize the captured biometric data. The display area 110 for visualizing the biometric data could also be the location where the biometric trait is captured, e.g., a transparent sensor for capturing the biometric data of a handwritten signature on an LCD display, as is generally disclosed in U.S. Pat. No. 5,297,202, the contents of which are incorporated herein by reference. In addition, the display area 110 may also serve as the above-mentioned display area 110 for displaying the checksum and/or the electronic dataset 100. The signature generation unit 111 could, therefore, be configured such that it only allows for the biometric trait, e.g. the signature, to be captured on the part of the display portion 100 that is also the part of the electronic dataset 100 where the signature must be inserted. This exemplary embodiment of a signature generation unit 111 is capable of preserving a close spatial connection or relationship between the indication or display of the biometric trait and a particular text or content, in a manner analogous to a "signature space" on a paper document.

Figure 2B:
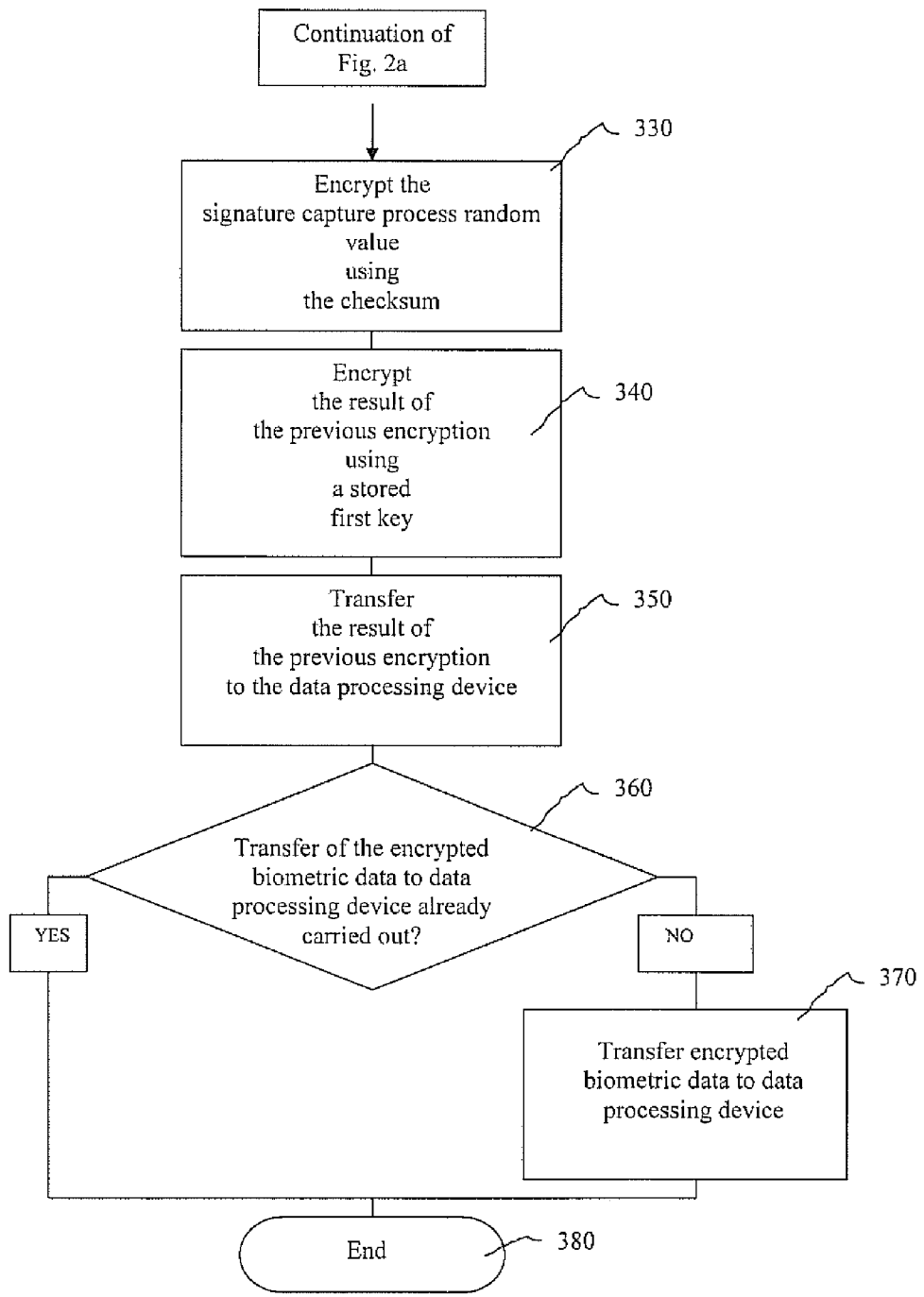
FIG. 2b shows a second part of a flow chart, which is a continuation of the representative method of FIG. 2a, FIG. 3 shows an exemplary alternative embodiment of the second part of the flow chart of the representative method.

Referring now to method step 330 in FIG. 2b, the signature generation unit 111 encrypts the generated signature capture process random value using the generated checksum.

Subsequently, the signature generation unit 111 uses a key for encrypting the result of the previous encryption, step 340. This key is stored in the signature generation unit 111 and cannot be read out from outside of the signature generation unit 111. Preferably, the key that is used is an asymmetric key 122 or 123 for asymmetrically encrypting the signature capture process random value, which has been previously symmetrically encrypted using the checksum.

Subsequently, the signature generation unit 111 transmits the signature capture process random value encrypted in this manner to the data processing device 109, step 350, if necessary together with the electronic dataset 100, in embodiments in which the dataset was loaded into the signature generation unit 111 for generating the checksum. If necessary, the encrypted biometric dataset, query 360, are also transmitted to the data processing device 109, step 370, in case the biometric dataset has not previously been transmitted.

Hence, according to this exemplary signature method according to the present teachings, decryption of the biometric dataset is only possible if one has the secret key that is stored in the signature generation unit 111, and neither the contents of the electronic dataset 100 nor the encrypted biometric dataset have been modified. If the key stored in the signature generation unit 111 is an asymmetric key, decryption of the biometric dataset may be performed only if a third party has the asymmetric key corresponding to the asymmetric key stored in the signature generation unit, and if neither the contents of the electronic dataset nor the encrypted biometric dataset have been modified. Only in such a case can a checksum having an identical content to the one generated in method step 4 be generated anew. Only by using these two values (i.e. the corresponding asymmetric key 122 or 123 and the checksum resulting from the intact data) can the signature capture process random value be decrypted and, hence, decrypted usable biometric dataset can be provided. This method may provide the advantage that, in case the electronic dataset 100 has been modified or manipulated, the biometric dataset automatically cannot be decrypted and are therefore become unusable.

Second Embodiment

A further exemplary embodiment of a representative method according to the present teachings comprises the above-described method steps 1 and 2 (see FIG. 2a) as well as one or more of the optional method steps a-c of the first embodiment. With reference now to FIG. 3, the subsequent method steps may be performed in a modified manner as compared to FIG. 2b.

The signature generation unit 111 uses the signature capture process random value in order to encrypt the generated checksum, step 430. Subsequently, the signature generation unit 111 uses an asymmetric key 122 or 123, which is stored therein and cannot be read out, in order to encrypt the signature capture process random value, step 440. Then, the signature generation unit 111 transmits the checksum, which has been encrypted in this manner, together with the encrypted signature capture process random value (if necessary together with the electronic dataset in case the dataset was loaded into the signature generation unit 111, and the encrypted biometric dataset if they have not been transmitted yet), to the data processing device 109, step 450. Steps 460-480 correspond to steps 360-380 of the previous embodiment.

Unlike in the first embodiment, the encrypted biometric dataset can now also be decrypted in case the dataset has been modified. According to this embodiment, only the signature capture process random value, which can be decrypted using the correct asymmetric key 122, 123, is required. Nevertheless, a reliable verification of the association and integrity is possible, because it is ensured that the encrypted checksum can be decrypted only using the same signature capture process random value if the checksum was also encrypted together with the electronic dataset when the biometric data were captured. Now, a checksum has to be generated again and compared with the decrypted checksum in order to be able to also verify the integrity of the dataset. In this method, the encrypted checksum and the encrypted biometric dataset may, however, be stored together with or in the electronic dataset 100, or the dataset can be archived or stored separately from each other. The same also applies to the encrypted signature capture process random value.

Third Embodiment

The biometric dataset encrypted in method step 260 of the first and second embodiments is directly, or indirectly, or by using a further device (e.g. a connected computer, such as the data processing device 109), transmitted to a secure storage location, e.g., an external server, which is accessible, for example, via the Internet. It should not be possible to read out this encrypted biometric dataset from this secure storage location without authorization of the operator of the storage location.

Only the checksum, which was output in the first or second embodiment, and the encrypted signature capture process random value are stored together with or in the electronic dataset. Hence, by using the asymmetric key 122, 123 that corresponds to the signature generation unit 111, the recipient will be able to decrypt the signature capture process random value and, thus, the checksum. However, due to the fact that the recipient has no access to the storage location of the encrypted biometric dataset, the recipient is not able to decrypt this biometric dataset.

The operator of the storage device should ordinarily authorize only a legally authorized expert to access this biometric dataset, or release this biometric dataset if both the signer, i.e. the owner of the biometric data, and the person carrying out the verification are in agreement.

In order to, nevertheless, enable a person carrying out the verification, to generate a new checksum for the electronic dataset 100 and the biometric dataset, so that this checksum can be compared with the decrypted checksum, the storage location has to enable the generation of a checksum for the encrypted biometric dataset. There are various approaches for implementing this function.

One possibility is that the person carrying out the verification will transmit the electronic dataset in question to the storage location, and that the checksum for the electronic dataset 100 and the biometric dataset, which are securely stored therein, is generated in the storage location. The generated checksum is then transmitted back to the person carrying out the verification. Since checksum algorithms operate in a data stream-based manner in most cases, there is, however, also the possibility that the person carrying out the verification will generate the checksum using the data that are available to him/her, and then transmit the state of checksum calculation to the storage location. The storage location then proceeds to generate the checksum for the securely stored encrypted biometric dataset and transmits the result back to the person carrying out the verification for further processing.

Fourth Embodiment

A further embodiment of a representative method according to the present teachings can be implemented like the first and second embodiments, but with the following modifications:

The signature generation unit 111 comprises a secret sequence of symbols. The signature generation unit 111 generates a signature capture process random value that is combined with the secret sequence of symbols stored in the signature generation unit 111. This combined value consisting of the secret sequence of symbols and the signature capture process random value is then used for encrypting the captured biometric dataset in the signature generation unit 111, before the encrypted biometric dataset is transmitted from the signature generation unit 111 to the data processing device 109.

In this regard, it is noted that the secret sequence of symbols and the signature capture process random value, which also may be a random sequence of symbols, may be combined either by linking the two or by a combination thereof (e.g., and/or linking). It is also conceivable to encrypt the signature capture process random value using the secret sequence of symbols, or to encrypt the secret sequence of symbols using the signature capture process random value, and to use the result of such a symmetric encryption.

Fifth Embodiment

Figure 5:
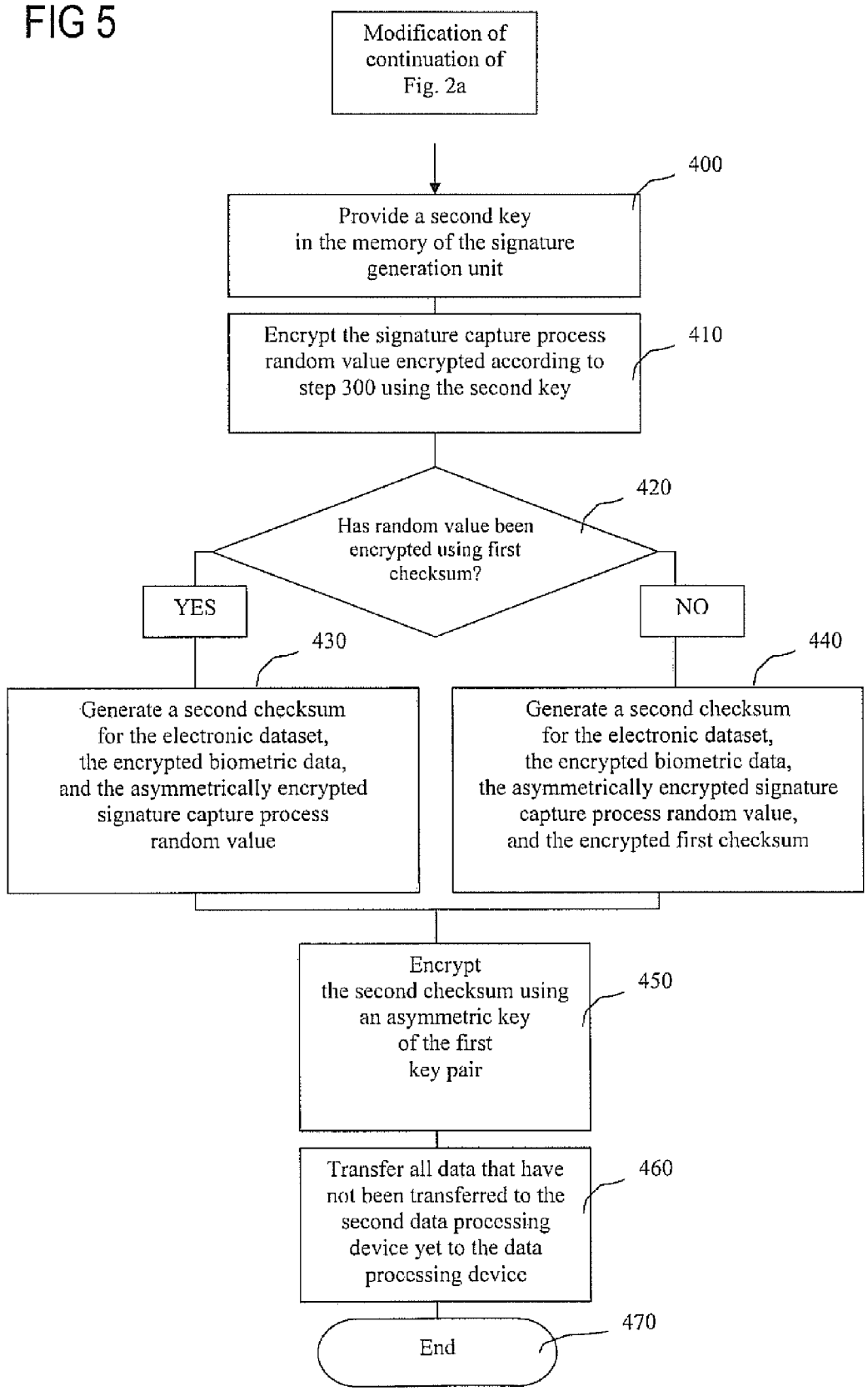
FIG. 5 shows another exemplary alternative embodiment of the second part of the flow chart, which may be used with either of the representative methods according to FIG. 2a or 4.

A fifth embodiment of a representative method according to the present teachings comprises method steps 200-320 of the first or second embodiments, and the following method steps, which will be explained with reference to FIG. 5:

The signature generation unit 111 comprises a second asymmetric key for asymmetric encryption. This second asymmetric key is stored in the memory that cannot be read out from outside of the signature generation device 111, step 400.

According to step 410, the signature capture process random value, which has been symmetrically encrypted using the checksum of step 330, is encrypted in the signature generation unit 111 using the second key.

Then, a second checksum is generated again, step 430. This second checksum is generated for the electronic dataset, the encrypted biometric dataset and the asymmetric encrypted signature capture process random value.

In case the asymmetrically-encrypted, signature capture process random value has not been encrypted using the first checksum before, query 420, but rather the first checksum is separately encrypted, the second checksum is additionally generated for the encrypted first checksum, step 440.

The second checksum may be generated in a manner analogous to the generation of the first checksum either in the signature generation unit 111 or in a second device, such as e.g., a computer. This second checksum may also be displayed on the signature generation unit 111 and possibly require a "read confirmation", as mentioned above.

The second checksum formed in step 430 or 440 is then encrypted using the asymmetric key 122 or 123 of the first asymmetric key pair, step 450.

All data that have not been transmitted to the second data processing device yet, i.e. at least the encrypted second checksum, are now transmitted to the data processing device 109 in step 460.

In this embodiment of the present teachings, since the key of a second asymmetric key pair is used for securing the biometric dataset, this key should not be stored in the signature generation unit 111 in a form that can be read out from outside. The key of the first asymmetric key pair, which is only used for encrypting the second checksum here, could be located both in the signature generation unit 111 and at the data processing device 109, which is less secure, but it would speed up the biometric data capturing process. In the latter case, encryption could be performed in the data processing device 109 or in a further computer connected thereto.

It is noted that the expression "first and second asymmetric key pairs" is only used to differentiate between the different pairs of keys. Whether a key pair is a "first" or a "second" pair, however, has no technical consequence.

Sixth Embodiment

A further exemplary modification of the first and second embodiments could be implemented as follows.

The signature generation unit 111 comprises an asymmetric key 122 or 123 of a first asymmetric key pair. The signature generation unit 111 itself generates a secret sequence of symbols either once, e.g., when first activated, or periodically, e.g., once a month. The secret sequence of symbols is stored in the memory of the signature generation unit 111 in a non-readable manner. Furthermore, after being generated, this secret sequence of symbols is encrypted using the above-mentioned asymmetric key of the first asymmetric key pair, and the result is readably stored and transmitted together with the other data at each data capture.

Subsequently, the signature generation unit 111 uses the secret sequence of symbols for encrypting the signature capture process random value that is symmetrically encrypted using the checksum. Alternatively, the signature generation unit 111 uses the secret sequence of symbols for encrypting the signature capture process random value.

Seventh Embodiment

The method according to the sixth embodiment may then be continued in a manner analogous to the first and second embodiments, or the generation of a second checksum may be initiated. This could be effected as follows:

A checksum is generated anew. This checksum is generated for the electronic dataset, the encrypted biometric dataset and the encrypted signature capture process random value. In case the signature capture process random value has not been encrypted using the first checksum, but rather the first checksum itself is provided separately encrypted, the second checksum is additionally generated for the encrypted first checksum. Analogous to the generation of the first checksum, the second checksum may be generated either in the signature generation unit 111 or in a second device, such as e.g., a computer. The second checksum also may be displayed on the signature generation unit 111 and possibly require a "read confirmation".

The second checksum thus generated is then encrypted using the asymmetric key 122 or 123 of a second asymmetric key pair.

All data that have not been transmitted to the second device 109 yet, i.e. at least the encrypted second checksum, are now transmitted to the data processing device 109.

It is noted that the asymmetric key pair used could be associated with, for example, the owner of the signature generation unit, or the signature generation unit itself (e.g., its serial number) by using its ID number or a certificate. This also applies to asymmetric key pairs that are used elsewhere. It is known in the art that the correctness of such an association of an asymmetric key may be certified or determined by using a certificate of the issuer/writer of the certificate (e.g., the manufacturer or a certification authority).

Eighth Embodiment

The above-described methods may also be modified as follows. It is a prerequisite that the signature generation unit 111 comprises a display area that is configured to display the displayable content of the electronic dataset 100. In case a longer electronic dataset is provided, e.g., an electronic document comprising a plurality of pages, the signature generation unit 111 may be configured to additionally include control elements configured to maneuver in the long dataset, e.g., to scroll it and/or to flip through a dataset comprising a plurality of pages, and/or to vary its display size, e.g., zoom.

According to this exemplary embodiment, the described methods may be supplemented by generating displayable content of the electronic dataset on the data processing device 109, as well as the transmission thereof to the signature generation unit 111. Further, all checksums would then be generated only based on the displayable content and in the signature generation unit 111 itself.

Ninth Embodiment

The above-described methods may also be modified as follows. More particularly, the signature generation unit 111 may be provided with the following additional functions.

The signature generation unit 111 is configured to extract individual values from the biometric dataset captured by it before the biometric dataset is encrypted, and to calculate, mask and/or derive additional and/or new values from this data. Thus, the signature generation unit 111 generates a dataset or a BioRef, which is in no way suitable to reconstruct the biometric data therefrom, but which is adequate to be compared with other BioRefs later on, and to make a determination, based on their similarity, as to whether the compared BioRefs belong to biometric datasets of the same person or not. The signature capture unit may then transmit this BioRef to another device in an unencrypted manner.

Such a BioRef may generated either by default or at each data capture, or it may be an optional function that can, for example, be activated by the second device (e.g. the computer) before initiating the data capture, if it is required. Depending on the type and amount of the computing speed required in the signature generation unit for the generation of a BioRef, such functionality, which can be switched on and off, might speed up the data capture operation if no additional automatic identification of the signer (by comparing a plurality of BioRefs) is required.

Tenth Embodiment

The EU Guideline regarding electronic signature (1999/93/EG/EG Signature Guideline—in the following referred to as "EU Guideline") defines three types of electronic signature:

(1) a (plain) electronic signature,
(2) an advanced electronic signature, and
(3) an advanced electronic signature, which is based on a qualified certificate and has been generated in a secure signature generation unit; in the following also referred to as a "qualified electronic signature" or QES.

As QES signatures always require the association of a signature key, such as e.g., a private key, to a signing person by trustworthy entity (e.g., Trustcenter), this form of e-signature is not suitable for use at a counter or other locations in a "face to face" business. This is because the signer usually is not physically carrying such a qualified certificate, and would not use it either, due to the legal presumption of security of a QES signature, which, for the signer, usually amounts to a shifting of the burden of proof to his disadvantage. Therefore, handwritten electronic signatures have achieved acceptance in many market segments. A handwritten electronic signature uses the biometric traits of the captured handwritten signature as an identifying trait of the signer. This biometric trait may be provided by any signer without requiring a special technical or hardware device, such as a smartcard, a registration, follow-up costs and legal disadvantages. This biometric trait is, however, not an asymmetric cryptographic key and, therefore, cannot be issued as a qualified certificate. Hence, handwritten electronic signatures may be only plain or advanced e-signatures according to the EU Guideline.

Although the phrasing regarding the advanced electronic signature seems to be completely technically neutral at first, it has been shown that, when using advanced electronic signatures, asymmetric cryptographic encryption algorithms always seem to be required. As a result, in practice, "unique data" have to be used for the generation of an advanced signature. Although the use of a private key was only mentioned in an exemplary manner herein, the uniqueness excludes the use of symmetric keys, because in this case, an identical key would be required both for the "generation" and the verification. Consequently, there would not be a unique key that only exists in the signature generation unit. Even if the signer "possesses" a signature generation unit, it does not necessarily mean that he/she is the owner thereof. From a legal point of view, possession may also be temporary due to a temporary 'license'. A signature system, which has a private key and is licensed to a person for electronic signature, definitely fulfils the requirement that the signature generation unit with the unique signature generation data is in the possession of the signer at the time of signing. In case of such a system, which, if necessary, is licensed to various people for signing (i.e. is subject to a changing possession), it may not make sense to fix the identity of the signer to the signature generation data, like the private key. When an advanced signature is used, this is not required either. Such an association of the private key with the identity of the signer is merely required for those advanced signatures that are based on a qualified certificate, which is referred to as a qualified electronic signature in the following. Therefore, the use of a biometric identifying trait, e.g., the handwritten signature in the context of an advanced electronic signature process, is actually possible, provided that unique signature generation data, e.g., a unique private key, are used in the signature generation unit.

Hence, in practice, handwritten electronic signatures sometimes consist of a combination of two signatures, on the one hand, the so-called electronic signature, which results from the captured biometric data of the handwritten signature (identifying trait) and their combination with a first checksum of the document (e.g. by combined encryption of checksum and biometric data); this type of signature may also be referred to as a biometric signature; and on the other hand, a digital signature, which results from the signing, i.e. the encryption, of a second document checksum with a private key.

The biometric signature may, however, be verified only by decrypting the first checksum and, thus, also the biometric dataset. A verification of the association of the biometric data with a person, however, only makes sense in the context of a verification process carried out by a handwriting expert and in practice—analogous to a signature on paper—is usually only required in legal disputes. In all other cases, a visible image of the signature is sufficient. Therefore, it should not be necessary to decrypt the biometric dataset in order to verify the integrity of the document, i.e. to verify whether the document has been manipulated. This is because, in this case, the biometric dataset could be misappropriated as kind of blank-signature or blank endorsement, e.g. by inserting a copy of the signature below another document. Thus, the additional digital signature may be used for this purpose.

In practice, various problems may result from these circumstances. For example, it may be problematic to ensure that the connection of the biometric dataset cannot be separated from the linkage of the biometric dataset with the document, i.e. the first checksum, and that the dataset cannot be misappropriated or decrypted by unauthorized persons in any other way. Even if the biometric dataset were already encrypted and connected with the checksum in the capture device, this key may be readable, it may have been generated somewhere else, or it may already have been copied. Further, the problem may arise that the manufacturer of the signature system no longer exists and that, therefore, it may no longer be possible to decrypt the biometric dataset for verification purposes. Further, there may be the problem that the private key of the digital signature is not safe from misappropriation or theft. Moreover, it may be problematic how a person carrying out the verification of the digital checksum can find out whether the verification key, i.e. the certificate, actually belongs to a private key of a trustworthy signature generation unit and is not merely a signature key with certificate generated by the manipulating person. Finally, there is the problem of how it can be ensured that the private key for the digital signature is unique, i.e. it only exists in a signature generation unit, in case of an advanced electronic signature.

The present teachings are capable of overcoming one or more of the above-mentioned problems, or at least providing improved approaches for solving the same.

According to a further aspect of the present teachings, a method for producing a signature generation unit is disclosed. In this exemplary method, the manufacturer of the signature generation unit possesses a public key of a first key pair. This first key pair has been generated by an external, trustworthy entity, such as a notary. The external entity therefore may be an entity, to which even the manufacturer has no access. The public key of this first key pair will subsequently be used in the signature generation unit for encrypting the biometric dataset. The private key of this first key pair is, therefore, securely stored or archived at the trustworthy entity, and is only provided by the trustworthy entity to an expert for decryption of individual biometric dataset, and only in case an electronic signature generated by the signature generation unit must be verified for the purpose of proof. The trustworthy entity may also provide the private key for evidentiary purposes, in case the manufacturer of the signature generation unit no longer exists. Neither the manufacturer nor the operator of the signature generation unit is provided with this private key. Any use of this key is carefully recorded by the trustworthy entity. Further, a signature generation unit having a memory that is, at least partially, not readable is provided. The public key generated by the trustable body is transmitted to the signature generation unit. Moreover, a data processing device is provided, which is not connected the outside world, for example, to the Internet. Such a data processing device is adapted to generate a second asymmetric key pair and to sign the second key pair using another asymmetric key, for example, a so-called root certificate. The second key pair, which is generated in this manner, or at least the private key of the second key pair, is written into the memory of the signature generation unit. Consequently, the private key of the second key pair is written into a portion of the memory that is not readable from the outside of the signature generation unit. As soon as the private key of this second key pair is written into the not-externally-readable memory portion, the key pair generated and signed on the data processing device, or at least the private key of the second key pair, is erased, preferably immediately after termination of the storage process. The erasure may be performed, for example, by clearing or deleting the memory in the data processing device.

One possible advantage of this approach is that it can be ensured that the connection of the biometric data cannot be separated from the linkage of the biometric data with the document, i.e. with the first checksum, and cannot be otherwise misappropriated or decrypted by unauthorized persons. As the public key of the first key pair, e.g., generated by the notary, is used in the processor of the signature generation unit when decrypting the biometric data, the extremely sensitive data can never be found in unencrypted form in the insecure environment of a data processing device like a computer, i.e., for example, in a random access memory. The private key of the second key pair is securely stored or archived at the trustworthy entity and is only provided to an expert for decrypting individual biometric data in case there is a dispute.

A further possible advantage of the present teachings is that it is ensured that, in legitimate cases, the biometric dataset may also be decrypted and verified if the manufacturer of the signature generation unit no longer exists, because, for example, the notary keeps the private key safe and may always provide the same in case a verification is carried out.

With the present teachings, it can be ensured that the private key of the digital signature has not been misappropriated or stolen, due to the fact that, for example, the manufacturer utilizes an isolated system during the production, which is separate from the company's intranet and the Internet and generates a second key pair in the final test of each signature generation unit. The generated private key is written into the non-readable memory of the processor. Due to the fact that the key pair is immediately deleted thereafter, i.e. it only exists in the signature generation unit, this private key is secure from misappropriation. It may, however, be used by the signature generation unit itself.

By using the present teachings, a person carrying out a verification of the digital signature may determine that the verification key, i.e. the certificate, actually belongs to a private key of a trustworthy signature generation unit. As the verification certificate, e.g., a Public Key Certificate of the Root Certificate that exists only in the manufacturing system of the manufacturer, has been signed, the verifier of the electronically signed document only has to verify the affiliation of the certificate, i.e. the public key of the second key pair, with the Root Certificate of the manufacturer. This may be performed, for example, by loading the public key of the Root Certificate into appropriate software for signature verification, e.g. Adobe Reader/Acrobat, in order to determine whether it is a signature key of a corresponding signature generation unit, which could not be read out and, therefore, could not be misappropriated.

Contrary to software, such as e.g., a software certificate, a signature generation unit, i.e. a hardware unit, according to the present teachings may not simply be reproduced by copying. Further, the manufacturing system of the manufacturer generates a new key pair for each signature generation unit, i.e. the key pair is not, for example, selected from a stock of already-existing keys. Therefore, the uniqueness of the key is directly linked with the uniqueness of the hardware.

Finally, it is noted that one or more method steps of one disclosed embodiment of the present teachings may also be combined with one or more method steps of another disclosed embodiment of the present teachings, such that the present specification inherently discloses further embodiments of the present teachings to a person with ordinary skill in the art. The same, of course, also applies to one or more biometric traits of the disclosed embodiments of a signature generation unit or a computer system.

The invention claimed is:

1. A method for electronically signing an electronic dataset comprising:
    a) providing a signature generation unit having a not-externally-readable memory that cannot be read out from outside of the signature generation unit, in which memory a first key is stored, wherein the signature generation unit is configured to carry out bi-directional data communication with a separate, data processing device, and to carry out an encryption method using the first key stored in the signature generation unit,
    b) providing a data processing device, which is spatially separated from the signature generation unit, and which is configured to carry out bi-directional data communication with the signature generation unit, and for providing the electronic dataset to be signed using the signature generation unit,
    c) capturing at least one biometric trait of a natural person, which person will electronically sign the electronic dataset using the signature generation unit,
    d) generating an electronic biometric dataset based on the at least one captured biometric trait in the signature generation unit,
    e) generating a signature capture process random value in the signature generation unit,
    f) encrypting the generated electronic biometric dataset in the signature generation unit using the generated signature capture process random value,
    g) determining whether the checksum will be generated in the signature generation unit, performing one of steps h1) and h2):
    h1) transmitting the encrypted biometric dataset to the data processing device, generating in the data processing device a first checksum of a combination of the encrypted biometric dataset and the electronic dataset, and transmitting the first checksum from the data processing device to the signature generation unit, and
    h2) transmitting the electronic dataset from the data processing device to the signature generation unit, and generating in the signature generation unit a first checksum of a combination of the encrypted biometric dataset and the electronic dataset,
    and performing one of steps i1)-k1) and i2)-k2):
    i1) encrypting the generated signature capture process random value in the signature generation unit using the first checksum,
    j1) encrypting the result of step i1) using the first key stored in the signature generation unit, and
    k1) transmitting the result of the encryption according to step j1) to the data processing device, and, if not already carried out in method step h1), transmitting the encrypted biometric dataset to the data processing device, and
    i2) encrypting the first checksum in the signature generation unit using the generated signature capture process random value,
    j2) encrypting the signature capture process random value using the first key stored in the signature generation unit, and
    k2) transmitting the results of the encryptions according to method steps i2) and j2) to the data processing device, and, if not already carried out in method step h1), transmitting the encrypted biometric dataset to the data processing device.

2. The method according to claim 1, wherein:
    a second key is stored in the not-externally-readable memory of the signature generation unit, and
    encryption according to step f) is carried out using a combination of the signature capture process random value and the stored second key.

3. The method according to claim 2, further comprising:
    generating the second key in the signature generation unit either once or periodically, and
    storing the generated second key in the non-readable memory of the signature generation unit.

4. The method according to claim 3, wherein the second key stored in the not-externally-readable memory of the signature generation unit comprises a sequence of symbols.

5. The method according to claim 4, wherein the first key stored in the signature generation unit is an asymmetric key of a first asymmetric key pair.

6. The method according to claim 4, wherein the first key stored in the signature generation unit is a symmetric key.

7. The method according to claim 5, wherein:
the signature generation unit is configured to carrying out an asymmetric encryption method using the asymmetric key, to generate the secret sequence of symbols stored in the not-externally-readable memory of the signature generation unit and to encrypt the sequence of symbols using the asymmetric key of the first asymmetric key pair, wherein the result of the asymmetric encryption is one of: (i) readably stored in the signature generation unit, and (ii) stored and transmitted to the data processing device in each signature capture process together with other data, and
the secret sequence of symbols serving as the first key is not readable from outside of the signature generation unit and is stored in an unencrypted manner in the memory of the signature generation unit.

8. The method according to claim 7, wherein:
the first checksum is generated in the signature generation unit,
the first checksum is generated based only upon a displayable content of the electronic dataset, and
the displayable content is stored together with or in the electronic dataset, based upon which the displayable content was generated, so that the displayable content is re-displayable for comparison, and a checksum for the content may be generated again.

9. The method according to claim 1, wherein:
the first checksum is generated in the signature generation unit,
the first checksum is limited to a displayable content of the electronic dataset, and
the displayable content is stored together with or in the electronic dataset, based upon which the displayable content was generated, so that the displayable content is re-displayable for comparison, and a checksum for the content may be generated again.

10. The method according to claim 1, wherein the first key stored in the signature generation unit is an asymmetric key of a first asymmetric key pair.

11. The method according to claim 1, wherein the first key stored in the signature generation unit is a symmetric key.

12. A signature generation unit comprising:
a memory that is not readable from outside of the signature generation unit, wherein a first key is stored in the memory,
a data communication unit configured to carry out bi-directional data communication with a separate, data processing device, wherein the data communication unit is configured to receive an electronic dataset to be signed using the signature generation unit from the data processing device,
an encryption unit configured to carry out an encryption method using the first key stored in the memory,
a biometric data capture device configured to capture at least one biometric trait of a person who will electronically sign the electronic dataset received from the data processing device, and configured to generate an electronic biometric dataset based on the at least one captured biometric trait,
a random value generation unit configured to generate a signature capture process random value,
an encryption unit configured to encrypt the generated electronic biometric dataset using the generated signature capture process random value,
a checksum generating unit configured to generate a first checksum of a combination of the encrypted biometric dataset and the electronic dataset,
an encryption device configured to encrypt the signature capture process random value generated in the random value generation unit using the first checksum, and
an encryption device configured to encrypt the encrypted signature capture process random value, which was encrypted using the first checksum, using the first key stored in the signature generation unit,
wherein the data communication unit is further configured to transmit to the data processing device: (i) the encrypted signature capture process random value, which was encrypted using the first checksum and the first key, and (ii) the encrypted biometric dataset.

13. A computer system, comprising:
the signature generation unit of claim 12, and
a data processing device spatially separated from the signature generation device and configured to carry out bi-directional communication with the signature generation unit.

14. A non-transitory computer-readable storage medium encoded with computer-readable code for instructing at least one processor to perform the method steps according to claim 1.

15. The signature generation unit according to claim 12, further comprising:
a display configured to display at least a portion of an electronic document to be signed, the electronic document being comprised in the electronic dataset.

16. The signature generation unit according to claim 15, wherein the biometric data capture device comprises a signature capture device configured to capture the signature of the person who will sign the electronic dataset.

17. The signature generation unit according to claim 16, wherein the first key is an asymmetric key of a first asymmetric key pair and the signature generation unit is further configured to perform an asymmetric encryption of the encrypted signature capture process random value using the asymmetric key.

18. The signature generation unit according to claim 17, wherein at least one processor is configured to generate the first checksum based only on a displayable content of the electronic dataset.

19. The signature generation unit according to claim 18, wherein a second key is stored in the not-externally-readable memory and the at least one processor is configured to encrypt the generated biometric dataset using a combination of the random value and the second key.

* * * * *